United States Patent [19]
Farris

[11] Patent Number: 4,770,577
[45] Date of Patent: Sep. 13, 1988

[54] TRANSPORT VEHICLE FOR COMBINE HARVESTER HEADERS

[76] Inventor: Gary C. Farris, P.O. Box 125, Edson, Kans. 67733

[21] Appl. No.: 729,997

[22] Filed: May 3, 1985

[51] Int. Cl.$^4$ .............................................. B60P 1/16
[52] U.S. Cl. ........................................ 410/2; 296/3;
280/789; 414/679; 410/96; 56/228
[58] Field of Search ................... 56/228, 15.5, 16.2,
56/1; 410/2, 3, 5, 4, 6, 7, 44, 96, 100, 101, 104,
156; 414/572, 467, 349, 350, 589, 679; 211/13;
280/400, 405 R, 405 B, 789; 296/3, 181

[56] References Cited

U.S. PATENT DOCUMENTS

| | | | |
|---|---|---|---|
| 939,335 | 11/1909 | Schuman | 414/470 |
| 2,335,692 | 11/1943 | Murray | 214/130 |
| 2,745,673 | 5/1955 | Koepke et al. | 410/2 X |
| 3,245,695 | 4/1966 | Bernard | 280/400 |
| 3,490,555 | 1/1970 | Noack | 56/228 X |
| 3,608,753 | 9/1971 | Scott | 56/228 X |
| 3,655,218 | 4/1972 | Taylor | 280/179 |
| 4,237,794 | 12/1980 | Biaggini et al. | 410/7 |
| 4,371,299 | 2/1983 | Cain et al. | 410/44 |
| 4,384,445 | 5/1983 | McIlwain | 56/228 |
| 4,385,483 | 5/1983 | McIlwain | 56/228 |

FOREIGN PATENT DOCUMENTS

| | | | |
|---|---|---|---|
| 1146561 | 11/1959 | France | 410/2 |
| 2455528 | 4/1980 | France | 410/4 |
| 924182 | 3/1961 | United Kingdom | 410/3 |
| 1431755 | 4/1976 | United Kingdom | 414/467 |
| 472828 | 9/1972 | U.S.S.R. | 410/5 |

Primary Examiner—Robert B. Reeves
Assistant Examiner—Scott H. Werny
Attorney, Agent, or Firm—Robert L. Farris

[57] ABSTRACT

A transport trailer 10 for moving a combine harvester header including a frame 12, support wheels 14 rotatably journalled on the frame 12, and hitch member 26 on the front end of the frame 12 for attaching the trailer 10 to a draft vehicle. One or more generally vertical guides 28 are attached to the frame 12. A generally horizontal guide 30 is attached to the frame 12 and extends outwardly from each generally vertical guide. A header support structure 32 is supported by a generally vertical guide 28 and a generally horizontal guide 30. Attaching devices 66 are provided for attaching a header to the support structure 32. A hydraulic cylinder 60 is attached to the frame 12 and the header support structure 32 to move the support structure 32 along a vertical guide 28 and simultaneously along a generally horizontal guide 30.

11 Claims, 3 Drawing Sheets

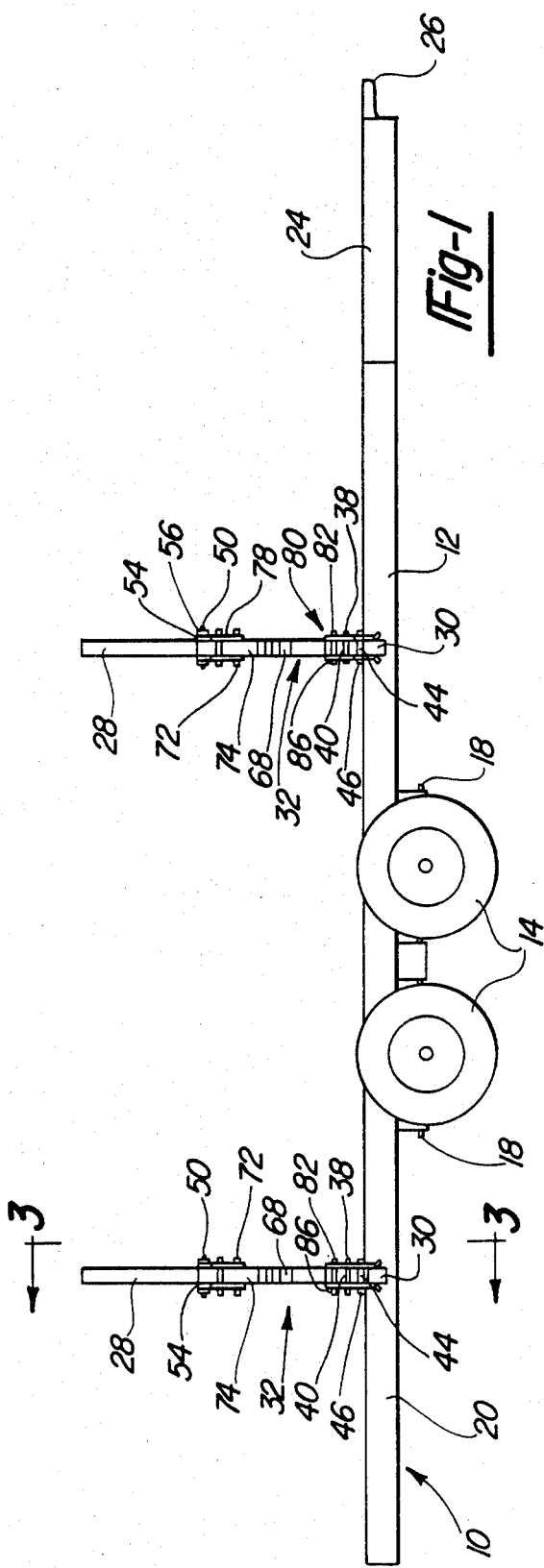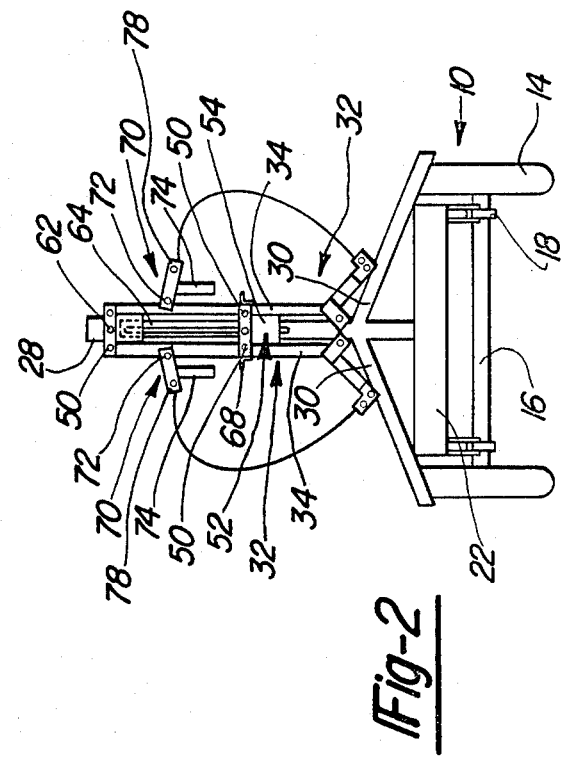

TRANSPORT VEHICLE FOR COMBINE HARVESTER HEADERS

DESCRIPTION

1. Technical Field

This invention relates to a vehicle for transporting elongated equipment that requires a change in orientation after it is placed on the vehicle. The change in orientation is required to change the dimensions of the vehicle and equipment combination and may also be used to shift the center of gravity.

2. Background Art

The transportation of elongated articles has been accomplished by securing the article to a separate support frame and then moving the frame together with the article onto the vehicle. The transportation of elongated articles has also been accomplished by providing fixed article support means on the vehicle and then positioning the article on the fixed support in the desired orientation. A few transport vehicles have included an article support structure that can be pivoted about a fixed pivot axis after an article is secured to the article support structure. Some of these prior article transport systems require special handling equipment to orientate, lift and position articles to be transported. Such equipment is not always available. The pivoted article support structures only reorientate an article about one fixed axis. Such limited movement is often insufficient and may require excessive force to pivot the article support structure.

DISCLOSURE OF THE INVENTION

The transport vehicle of this invention includes an elongated frame. A first generally vertical guide structure is attached to the frame. A second generally vertical guide structure is attached to the frame at a location spaced from the first generally vertical guide structure. A first generally horizontal guide is attached to the frame in a position to cooperate with the first generally vertical guide structure and a second generally horizontal guide is attached to the frame to cooperate with the second generally vertical guide structure. A first equipment support structure is provided with one portion movable along the first generally verticle guide and another portion movable along the first generally horizontal guide. A second support structure is provided with one portion movable along the second generally vertical guide and another portion movable along the second generally horizontal guide. Power means are provided to move each support means along the generally vertical and horizontal guides.

An elongated article such as a header for an agricultural combine harvester, like the headers disclosed in U.S. Pat. No. 3,324,637 to Ashton et al, can be placed directly on the first and second support structures by a combine harvester. The header can be secured to the support structures and released from the combine as disclosed by Ashton et al. The support structures can then have their portions movable along the generally vertical guides moved upwardly along the guides. As the portion of the support structures that are movable along the generally vertical guides move upwardly, the portion of the support structures that are movable along the generally horizontal guides move generally horizontally toward the vertical guides. This results in the header being rotated about an axis along its length and moving inward toward the generally vertical guides. This reduces the width of the transport vehicle and combine harvester header combination.

The generally vertical guides can be placed mid-way between the sides of the frame. The generally horizontal guides can extend outwardly from the vertical guides toward both frame sides. A second set of support structures can then be provided for a second header. With a header on each side of the vertical guides, both headers can be rotated about axes running along their length and be moved inwardly toward the generally vertical guides. This results in the overall width of the vehicle and header combination being substantially reduced.

An object of this invention is to provide a transport vehicle which can receive elongated equipment, such as a header for a combine harvester, directly from a combine harvester and then rotate the header about an axis along its length while at the same time moving a portion of the header toward the center of the vehicle.

Another object is to provide a transport vehicle which can receive two elongated articles such as headers for combine harvesters, directly from combine harvesters and then rotate the headers about axes along their lengths while at the same time moving a portion of both headers toward each other and the center of the vehicle to reduce the overall width of the transport vehicle and two headers.

The foregoing and other objects, features and advantages of the present invention will become more apparent in the light of the following detailed description of exemplary embodiments thereof, as illustrated in the accompanying drawing.

DESCRIPTION OF THE DRAWINGS

FIG. 1 is a side elevation of a trailer which embodies the invention;

FIG. 2 is a rear elevation of the trailer of FIG. 1 with the support structure in a raised transport position;

BEST MODE FOR CARRYING OUT THE INVENTION

Figure 3:
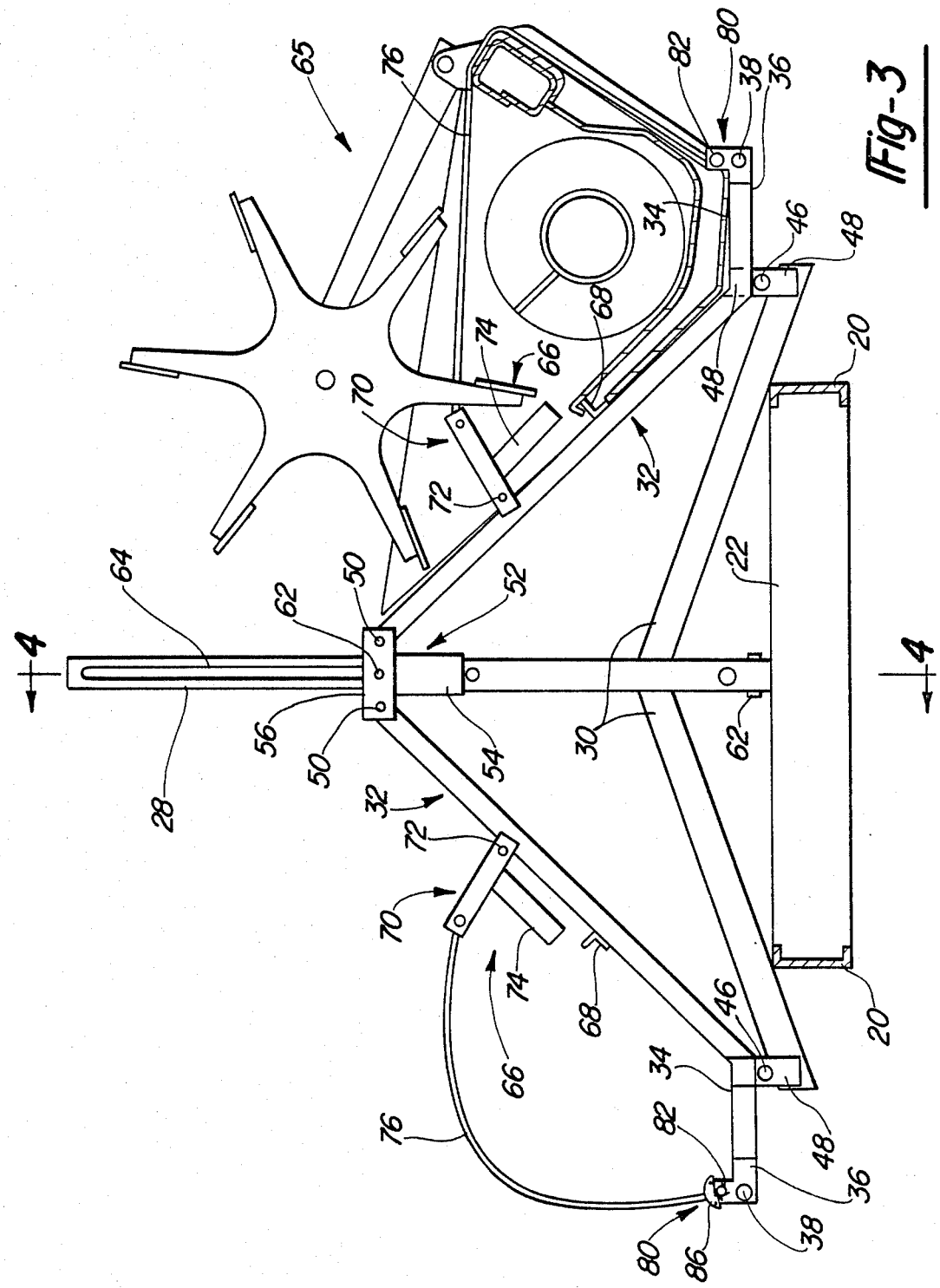
FIG. 3 is an enlarged sectional view taken along lines 3—3 of FIG. 1 with an agricultural combine harvester header attached to the support structures on one side and having one end of the header broken away.

As shown in the drawing, the invention is employed on a trailer 10. It could also be employed on a pallet or on a truck for example. The trailer 10 includes a frame 12, and support wheels 14. The support wheels 14 are journalled on axles 16 which are connected to the frame 12 by springs 18. The springs 18 cushion the frame 12 and distribute the load on all the wheels 14 as the trailer moves over uneven ground.

The frame 12 includes a long channel member 20 on each side. The channel members 20 are connected by a number of cross members 22. At the forward end of the frame 20, a support structure 24 is provided for a hitch member 26. The hitch member 26 as shown is a ring member which can be connected to a standard pintle hook on a motor vehicle.

A pair of verticle guide members 28 are attached to cross members 22 mid-way between the channel members 20. The vertical guide members 28 are spaced apart along the length of the frame to support an elongated article at the desired positions along its length. The vertical guide members 28 are positioned relative to the support wheels 14 to provide the proper weight distribution on the trailer 10. A sufficient load must be transferred from the hitch member 26 to a towing vehicle for the trailer 10 to follow properly behind the towing vehicle.

A pair of generally horizontal guides 30 are welded to the frame 10 and to each of the vertical guide members 28. These guides 30 each extend outwardly from the vertical guide member 28 to a point past the channel member 20 of the frame 10. The generally horizontal guides 30 can be horizontal if desired. However it has been found to be desirable to raise the end of each guide 30 that attaches to the generally vertical guide member 28 so that the generally horizontal guides 30 each extend outwardly and slightly downwardly from the vertical guide member 28. The position of the channel member 20 of the frame 10 has a height above the ground that is somewhat fixed by the size of the wheels 14. The outer end of each generally horizontal guide 30 which extends out past the frame 12 can be lowered by raising the inner end which is welded to the vertical guide 28. In some cases it is desirable to lower the outer end of the generally horizontal guide 30. An inclined guide surface may also have advantages.

A support structure 32 is provided to cooperate with each generally vertical and horizontal guide 28 and 30. Each support structure 32 includes a body section 34. The lower outer portion of each support structure 32 includes apertured straps 36 welded to each side of the body section 34, a pin 38 which passes through the apertures and a roller 40 on the pin 38 between the two apertured straps 36. Straps 42 are welded to each side of the body section 34 to guide the support structure 32 along the generally horizontal guide 30.

An Intermediate roller 44 is mounted on the outer end of the support structure 32 by a pin 46 which passes through two straps 48 welded to adjacent sides of the body section 34. The two straps 48 extend beyond the roller 44 and along side the generally horizontal guide 30. The roller contacts the upper surface of the generally horizontal guide 30 and supports the outer portion of the support structure 32. The function of the rollers 40 and 44 will be described in more detail below.

The inner end of each support structure 32 is pivotally attached by a pin 50 to a sleeve assembly 52. The sleeve assembly 52 includes a rectangular sleeve section 54 which surrounds each general vertical guide member 28. A plate 56 is welded to the forward wall of the sleeve section 54 with apertured portions extending past the side walls of the sleeve section 54. A second plate 56 is welded to the rear wall of the sleeve section 54 opposite the plate 56 welded to the forward wall. The pin 50, which pivotally attaches the inner end of a support structure 32 to the sleeve assembly 52, passes through apertures in two of the plates 56.

A hydraulic cylinder 60 is mounted inside each generally vertical guide member 28 by a pin 62. The upper end of each hydraulic cylinder 60 is pivotally attached to the sleeve assembly 44 by a pin 62. Slots 64 are provided in the front and rear walls of the generally vertical guide member 28 to allow passage of the pin 62 when the hydraulic cylinder 60 moves the sleeve assembly 52 up and down on the generally vertical guide member 28.

The body section 34 of the support structure 32 is shaped to fit the header 65 for a combine harvester or some other elongated article which is to be secured to the support structure 32. Fastener means 66 are provided to attach a header or other elongated articles to the support structure. This fastener means 66 must be designed to accommodate the article that is to be transported by the transport vehicle. One possible structure includes a stop member 68 for engaging the back side of a knife support bar or some other structure on a header bottom to limit movement along the length of the body seciton 34. A clamp member 70 is pivotally attached to the body section 34 by a pin 72. One arm 74 of the clamp member 70 engages the upper surface of a header. A strap 76 is attached to a free end of an arm 78 and, when tensioned, causes the arm 74 to hold a header down on the body section 34. The free end of the strap 76 passes up and over the top of a header and down to a standard strap tensioner 80. The strap tensioner includes a slotted pin 82 rotatably journalled in a bracket 84 welded to the outer end of the body section 34. The end of the strap is passed through the slot in the slotted pin 82. The slotted pin 82 is rotated until the strap 76 is tight and is held in position by a dog 86. The strap 76 in combination with the clamp member 70 effectively secures the header to the support structure 32.

The support structure 32 is in the position to receive a header when it is in the position shown in FIG. 3. In this position the outer end is supported on the generally horizontal guide 30 by the roller 44. After a header is secured to the support structure 32 by the fastener means 66, oil is pumped into the cylinder 66 to raise the sleeve assembly 52. As the sleeve assembly 52 moves up along the generally vertical guide 28, the roller 44 moves along the horizontal guide 30 toward the vertical guide 28. After the sleeve assembly 52 moves up some distance, the roller 40 engages the upper surface of the generally horizontal guide 30. Continued raising of the sleeve assembly 52 will move the support structure 32 to the position shown in FIG. 2 with the roller 44 in contact with the generally vertical guide 28. In this position the overall width is reduced to a minimum. The header can be unloaded by reversing the process.

Modification of the support structure 32 to fit other headers or elongated articles may make it possible to eliminate one of the rollers 40 or 44.

The transport vehicle as shown is designed to transport two headers. Each header is attached to two support structures 32. Additional support structures 32 may be employed if desired or a single support structure may be used. If only one header is to be transported, it would be desirable to move the generally verticle guides 28 toward one side of the frame 12.

Figure 5:
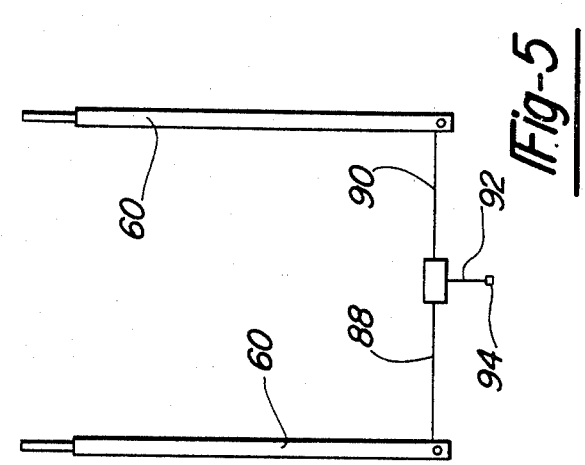
FIG. 5 is a schematic diagram of a hydraulic system which may be employed to carry out the invention.
Figure 4:
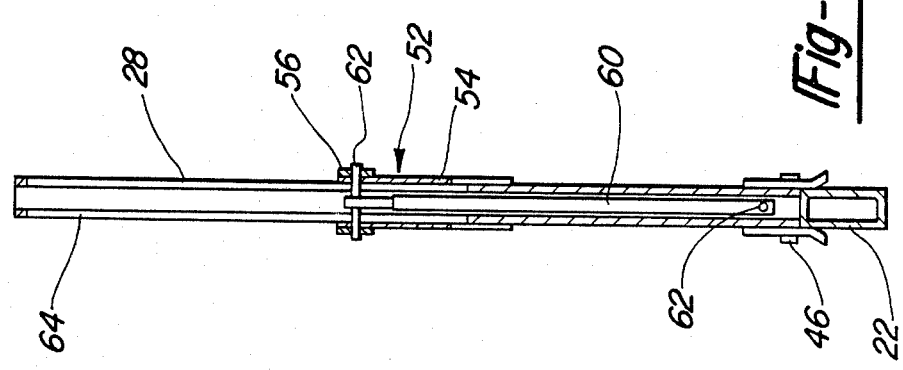
FIG. 4 is a sectional view taken along lines 4—4 of FIG. 3.

The hydraulic system shown in FIG. 5 includes two single acting cylinders connected hydraulically in parallel by hydraulic lines 88, 90 and 92. The line 92 has a quick attach coupling 94 which can be connected to the hydraulic system of a combine harvester. A parallel system can be used because the load on the cylinders will increase as the sleeve assemblies 52 are raised. Oil will tend to flow to the lowest cylinder with the smallest load during raising. If desired a flow divider can be added at the junction between the hydraulic lines 88, 90 and 92. A double acting hydraulic system may be used if desired. With a double acting system, the sleeve assembly 44 can be forced down as well as up. A hydraulic pump and a pump drive can be mounted on the frame 12 and connected to the cylinders 60 to supply hydraulic oil if it is desired to have a self contained hydraulic system on the trailer 10.

I claim:

1. A transport means, for combine harvester headers, including a frame, a first generally vertical guide secured to the frame, a first generally horizontal guide secured to the frame, a first elongated equipment support means, for supporting a combine harvester header between the ends of said combine harvester header, with one portion of the elongated equipment support means guided in a generally vertical path by the generally vertical guide and another portion of said elongated equipment support guided in a generally horizontal path by the generally horizontal guide, fastening means to attach a combine harvester header to the equipment support means between the ends of the combine harvester header so that the ends of the combine harvester header extend outwardly past the equipment support means and power means to move the equipment support means simultaneously along both the generally horizontal guide and the generally vertical guide.

2. The transport means for combine harvester headers of claim 1 including a second generally vertical guide secured to the frame and spaced from the first generally vertical guide, a second generally horizontal guide secured to the frame and spaced from the first generally horizontal guide and second elongated equipment support means with one portion guided in a generally vertical path by the second generally vertical guide and another portion guided in a generally horizontal path by the second generally horizontal guide, fastening means to attach a combine harvester header to the second elongated equipment support means and power means to move the second elongated equipment support means simultaneously along both the second generally horizontal guide and the second generally vertical guide.

3. The transport means for combine harvester headers of claim 1 wherein the frame has a right side and a left side, the first generally vertical guide is secured to the frame between the right and left sides of the frame, the first generally horizontal guide extends from the left side of the frame toward the first generally vertical guide, another generally horizontal guide attached to the frame and extending from the right side of the frame toward the first generally vertical guide, right side elongated equipment support means with one portion guided in a generally vertical path by the generally vertical guide and another portion guided in a generally horizontal path by the generally horizontal guide extending from the right side of the frame, and fastening means to attach a combine harvester header to the right side elongated equipment support means.

4. The transport means for combine harvester headers of claim 2 wherein the frame has a right side and a left side, the first and second generally vertical guides are secured to the frame between the right and left sides of the frame, the first and second generally horizontal guides extend from the left side of the frame toward the first and second generally vertical guides, a third generally horizontal guide attached to the frame and extending from the right side of the frame toward the first generally vertical guide, a first right side elongated equipment support means with one portion guided in a generally vertical path by the first generally vertical guide and another portion guided in a generally horizontal path by the third generally horizontal guide, fastening means to attach a combine harvester header to the first right side equipment support means, a fourth generally horizontal guide attached to the frame and extending from the right side of the frame toward the second generally vertical guide, a second right side elongated equipment support means with one portion guided in a generally vertical path by the second generally vertical guide and another portion guided in a generally horizontal path by the fourth generally horizontal guide, and fastening means to attach a combine harvester header to the second right side equipment support means.

5. The transport means for combine harvester headers of claim 2 including a vertical guide follower on each vertical guide, pivot means pivotally securing the first elongated equipment support means to the vertical guide follower on the first generally vertical guide, and pivot means pivotally securing the second elongated equipment support means to the vertical follower on the second generally vertical guide.

6. The transport means for combine harvester headers of claim 5 wherein the power means to move the first and second elongated equipment support means includes a hydraulic cylinder secured to the frame and the vertical guide follower on the first generally vertical guide, and a hydraulic cylinder secured to the frame and the vertical guide follower on the second generally vertical guide.

7. The transport means for combine harvester headers of claim 4 including a vertical guide follower on each vertical guide, pivot means pivotally securing the first elongated equipment support means and the third elongated equipment support means to the vertical guide follower on the first generally vertical guide, and pivot means pivotally securing the second elongated equipment support means and the fourth elongated equipment support means to the vertical guide follower on the second generally vertical guide.

8. The transport means for combine harvester headers of claim 7 including a hydraulic cylinder secured to the frame and the vertical guide follower on the first generally vertical guide and a hydraulic cylinder secured to the frame and the vertical guide follower on the second generally vertical guide.

9. A transport trailer for two combine harvester headers including a frame, support wheels rotatably journalled on the frame, hitch means on the front end of the frame for attaching the trailer to a draft means, at least two vertical guides secured to the frame near a center line running the length of the trailer, a right side generally horizontal guide attached to the frame and extending to the right side of the trailer from each vertical guide, a left side generally horizontal guide attached to the frame and extending to the left side of the trailer from each vertical guide, a plurality of right side header support means for supporting a combine harvester header with the ends of the header extending away from the header support means, one of the two vertical guides and one of the right side generally horizontal guides supporting each right side header support means, a plurality of left side header support means for supporting a combine harvester header with the ends of the header extending away from the header support means, one of the two vertical guides and one of the left side generally horizontal guides supporting each left side header support means, and power means attached to the frame and the header support means for moving one end of the header support means along the vertical guides and simultaneously moving the other end of the header support means along the generally horizontal guides.

10. The transport trailer for two combine harvester headers of claim 9 wherein the generally horizontal guides extend outwardly and slightly downwardly from the vertical guides.

11. A transport means for combine harvester headers including a frame, a first generally horizontal guide secured to the frame, a first elongated equipment support means with an outward portion and an inboard portion for supporting a combine harvester header between the ends of said combine harvester header with the outboard portion supported by and guided in a generally horizontal path by the first generally horizontal guide, and power means attached to the frame and to the first elongated equipment support means and operable to move the inboard portion of the first elongated equipment support means along a generally vertical path and simultaneously move said outboard portion of the first elongated equipment support means along the first generally horizontal guide, a second generally horizontal guide secured to the frame parallel to the first generally horizontal guide, and spaced from the first generally horizontal guide, a second elongated equipment support means with an outboard portion and an inboard portion for supporting a combine harvester header between the ends of said combine harvester header with the outboard position supported by and guided in a generally horizontal path by the second generally horizontal guide and power means attached to the frame and to the second elongated equipment support means and operable to move the inboard portion of the second elongated equipment support means along a generally vertical path and simultaneously move the outboard portion of the second elongated equipment support means along the second generally horizontal guide and in a path parallel to the path of movement of the outboard portion of the first elongated equipment support means.

* * * * *